Aug. 4, 1936.   C. A. IVES   2,050,094

COMPRESSOR

Filed June 5, 1935

Inventor:
Charles A. Ives,
by Harry E. Dunham
His Attorney.

Patented Aug. 4, 1936

2,050,094

UNITED STATES PATENT OFFICE 2,050,094

COMPRESSOR

Charles A. Ives, Erie, Pa., assignor to General Electric Company, a corporation of New York Application June 5, 1935, Serial No. 25,062

9 Claims. (Cl. 230—202)

My invention relates to compressors and more particularly to compressors of the type having a sealed casing and a driving shaft projecting therefrom to which a prime mover is connected by a belt or other suitable driving connection.

Compressors of this type are usually provided with a shaft seal which may be of the bellows type, a stuffing box, or the like, and which prevents the escape of fluid from the compressor casing along the driving shaft. Difficulty has been experienced in maintaining the integrity of such shaft seals because of the strain placed thereon by the driving connection. This is particularly true in the case of compressors of the belt driven type which are mounted under railroad cars where they are subjected to severe shocks and vibrations. Conventional compressors of this type are usually provided with a driving pulley which is mounted on the driving shaft. Injury to the shaft seal is likely to arise in such machines, not only from the lateral strain placed on the seal by the tension in the belt and the weight of the driving pulley, but also from the torsional vibration of the driving pulley.

It is an object of my invention to provide an arrangement for minimizing both the lateral and torsional stresses to which a shaft seal for compressors of the type described is subjected during the normal operation of the compressor.

Further objects and advantages of my invention will become apparent as the following description proceeds and the features of novelty which characterize my invention will be pointed out with particularity in the claims annexed to and forming a part of this specification.

Figure 1:
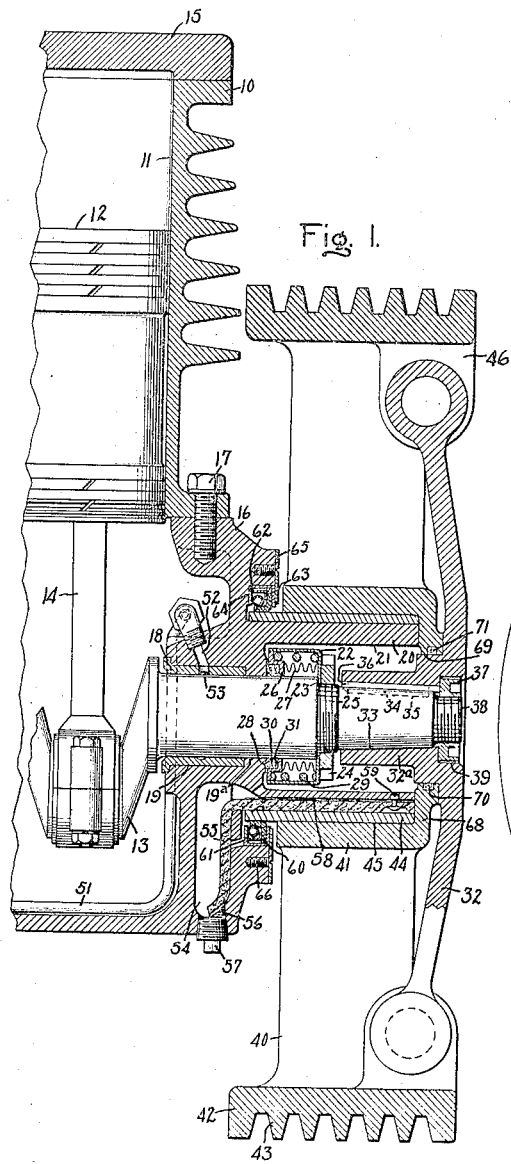
Figure 2:
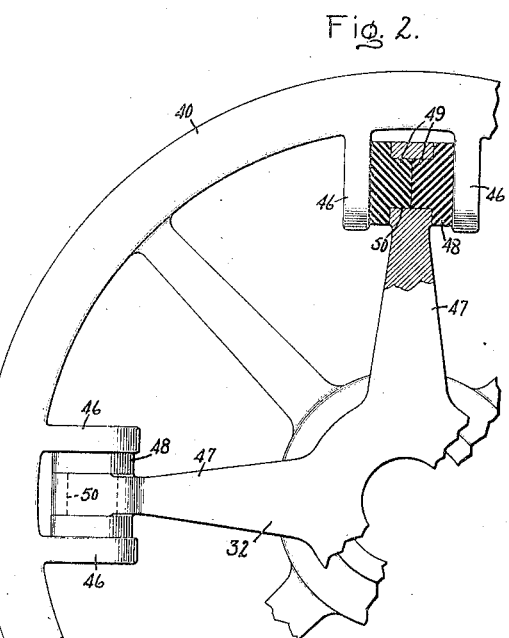

For a better understanding of my invention, reference may be had to the accompanying drawing in which Fig. 1 is a side elevation partly in section of a portion of a compressor provided with a shaft seal and an arrangement for minimizing the lateral and torsional stresses placed thereon embodying my invention; and Fig. 2 is a side elevation partly in section of a portion of the driving pulley and spider of the compressor shown in Fig. 1.

Referring to the drawing, I have shown in Fig. 1 a compressor of the reciprocating type including a vertical cylinder 10 provided with a vertical cylindrical bore 11 in which a piston 12 is reciprocated by a crank shaft 13 which is connected thereto by a connecting rod 14. The upper end of the cylinder bore 11 is closed by a cylinder head 15 provided with suitable valves (not shown). The lower portion of the compressor casing is formed by a crank shaft casing 16 which is secured to the lower portion of the cylinder 10 by cap screws 17. One end of the crank shaft 13 is journaled in a sleeve bearing 18 which is mounted in a recess 19 formed in the casing 16 at the inner end of the horizontal bore 19a.

One end of the crank shaft or driving shaft 13 projects through the bore 19a formed in the casing 16 and a driving connection embodying my invention is secured thereto. The projecting portion of the driving shaft 13 is surrounded by an integral cylindrical supporting hub 20 formed on the end of the casing 16. The supporting hub 20 is provided with a longitudinal cylindrical bore 21 which surrounds the projecting portion of the driving shaft 13 and in which the shaft seal is located.

In the illustrative form of my invention the shaft seal is of the bellows type and includes a cylindrical metal cup 22 which is clamped against a shoulder 23 formed on the driving shaft 13 by a lock nut 24. The lock nut 24 engages a threaded portion 25 of the driving shaft 13 and when the lock nut 24 and cup 22 are secured in place the cup is thus rigidly secured to the shaft 13 and hence caused to rotate therewith. A metal collar 26 having a Z-shaped cross-section is slidably mounted on the driving shaft 13 adjacent the inner end of the cup 22. The collar 26 and cup 22 are joined by a flexible metallic bellows 27 which is formed in an accordion shape and the opposite ends of which are rigidly secured to the collar 26 and cup 22, respectively, entirely about the edges thereof so that the leakage of fluid between the adjacent portions of the bellows 27 and collar 26 or cup 22 is prevented. The collar 26 is urged toward a shoulder 28 formed on the casing 16 and surrounding the shaft 13 by a helical compression spring 29. A sealing ring 30 of suitable metal is mounted in a recess 31 formed in the collar 26 and runs in contact with the shoulder 28 so as to prevent the escape of fluid between the contacting surfaces of the shoulder 28 and the sealing ring 30. The escape of fluid from the casing 16 along the driving shaft 13 is thus effectually prevented despite any longitudinal displacement of the driving shaft 13 since the compression spring 29 maintains the contacting surfaces of the shoulder 28 and collar 26 in firm engagement and the bellows 27 prevents the escape of fluid between the collar 26 and cup 22.

A spider 32 is mounted on the end of the driving shaft 13, the spider being provided with an integral hub 32a which is rigidly secured to the tapered end of the shaft 13 and extends within the longitudinal bore 21. The interior bore 33 of the spider hub 32a is tapered in order that it will fit tightly on the tapered end of the shaft 13 and a key 34 which is fitted in slots 35 and 36 formed in the driving shaft 13 and spider hub 32a, respectively, prevents relative rotation therebetween. Longitudinal displacement of the spider 32 is prevented by a lock nut 37 which is secured to the threaded end portion 38 on the driving shaft 13 in a counter bore 39 formed in the outer end of the spider hub 32a.

The spider 32 is connected to a suitable driving pulley 40 having a hub 41 journaled on the supporting hub 20 formed on the casing 16. The driving pulley 40 is preferably made sufficiently large in order that it may be utilized as a flywheel for the compressor. The rim 42 of the flywheel is provided with a series of V-shaped grooves 43 adapted to receive a series of V-type driving belts. A sleeve bearing 44 is rigidly secured to the interior of a bore 45 formed in the pulley hub 41 in order to form a suitable bearing surface therefor. The weight of the driving pulley 40 is thus carried by the supporting hub 20 formed on the casing 16 rather than by the driving shaft 13. As a consequence, the shaft seal is protected from lateral strains which would otherwise be imposed thereon due to flexure of the driving shaft 13 caused by the movement of the relatively heavy driving pulley 40. This arrangement also protects the shaft seal from lateral strains due to tension in the driving belts which engage the driving pulley 40.

A series of integral inwardly extending lugs 46 are formed on the inner periphery of the rim 42 of the driving pulley and these lugs are resiliently connected to the ends of radial arms 47 of the spider 32 by rubber plugs 48. The rubber plugs 48 are circular in cross-section and the reduced inner ends 49 thereof are mounted in cylindrical bores 50 formed in the outer ends of the radial spider arms 47. The outer ends of the plugs 48 are pressed against the inner faces of the lugs 46. The resilient connection thus formed between the spider 32 and the driving pulley 40 prevents transmission of torsional oscillatory forces from the driving pulley 40 to the spider 32 and hence protects the shaft seal against torsional strains resulting from these forces.

Lubricant is supplied under pressure to the sleeve bearing 18 through a conduit 51 from the casing 16 or other suitable source. One end of the conduit 51 communicates with a passage 52 formed in the casing 16 which in turn communicates with an oil hole and groove 53 formed in the sleeve bearing 18. Lubricant is supplied to the contacting surfaces of the pulley hub bearing 44 and supporting hub 20 from a recess 54 formed on the exterior side of the casing 16 through a wick 55. The lubricant may be drained from the recess 54 through a tapped hole 56 formed in the bottom thereof which is closed by a threaded plug 57. The upper portion of the wick 55 is secured in a slot 58 formed on the lower side of the supporting hub 20 by a rivet 59.

The escape of lubricant along the exterior side of the bushing 44 is prevented by an oil seal which includes an annular fabric collar 60 which is pressed against the surface of the bushing 44 by an annular helical tension spring 61. The fabric collar 60 and spring 61 are mounted within a metal collar 62 having a channel-shaped cross-section. The inner end of the fabric collar 60 is retained in position within the collar 62 by an annular metal insert 63 having an L-shaped cross-section. The channel-shaped collar 62 is retained within a recess 64 formed in the exterior side of the casing 16 and surrounding the inner end of the supporting hub 20 by an annular plate 65 which is in turn secured to the exterior side of the casing 16 by machine screws 66.

The hub 41 of the driving pulley 40 is provided with an inwardly extending flange 68 at the outer end thereof which cooperates with a shoulder 69 formed on the adjacent portion of the hub 32a of the spider to prevent the entrance of dirt or other foreign matter into the longitudinal bore 21 formed on the supporting hub 20. The flange 68 is provided with an annular recess 70 therein in which a felt washer or sealing ring 71 is mounted which aids in sealing the entrance to the longitudinal bore 21. This arrangement also prevents the escape of lubricant from the outer end of the longitudinal bore 21 which may have entered therein from the contacting surfaces of the supporting hub 20 and the driving pulley bearing 44.

It will thus be seen that I have provided a compact and rugged construction in which not only the lateral strains but also the torsional strains exerted on the shaft seal are minimized. In the construction which I have provided the shaft seal is protected from the entrance of dirt or other foreign matter thereto and the longitudinal length of the mounting for the driving pulley, spider, and shaft seal is minimized.

While I have shown the particular embodiment of my invention in connection with a reciprocating type compressor, I do not desire my invention to be limited to the particular construction shown and described and I intend in the appended claims to cover all modifications within the spirit and scope of my invention.

What I claim as new and desire to secure by Letters Patent of the United States is:

1. In combination, a compressor including a casing having a driving shaft extending therefrom and sealing means surrounding said shaft for preventing the leakage of fluid from said casing along said shaft, a hub formed on said casing and surrounding said sealing means and said shaft, a driving pulley journaled on said hub, a member having radially extending portions rigidly secured to said shaft, and means for resiliently connecting said radially extending portions of said member and said pulley in driving relation, said hub and said pulley mounted thereon cooperating with said member and said last named means to constitute a driving connection for said compressor adapted to exert a minimum torsional and lateral strain on said sealing means.

2. In combination, a compressor including a casing having a driving shaft extending therefrom and sealing means including a flexible metal bellows secured to said shaft for preventing the leakage of fluid from said casing along said shaft, a hub formed on said casing and surrounding said sealing means and said shaft, a driving pulley journaled on said hub, a member having radially extending portions rigidly secured to said shaft, and means for resiliently connecting said radially extending portions of said member and said pulley in driving relation, said hub and said pulley mounted thereon cooperating with said member and said last named means to constitute a driving connection for said compressor adapted to exert a minimum torsional and lateral strain on said sealing means.

3. In combination, a compressor including a casing having a driving shaft extending therefrom and sealing means surrounding said shaft for preventing the leakage of fluid from said casing along said shaft, a hub formed on said casing and surrounding said sealing means and said shaft, a driving pulley journaled on said hub, a member having radially extending portions rigidly secured to said shaft, and means including a plurality of compressible rubber plugs inserted between said radially extending portions of said member and said pulley for connecting the same in driving relation, said hub and said pulley mounted thereon cooperating with said member and said last named means to constitute a driving connection for said compressor adapted to exert a minimum torsional and lateral strain on said sealing means.

4. In combination, a compressor including a casing having a driving shaft extending therefrom and sealing means including a flexible metal bellows secured to said shaft for preventing the leakage of fluid from said casing along said shaft, a hub formed on said casing and surrounding said sealing means and said shaft, a driving pulley journaled on said hub, a member having radially extending portions rigidly secured to said shaft, and means including a plurality of compressible rubber plugs inserted between said radially extending portions of said member and said pulley for connecting the same in driving relation, said hub and said pulley mounted thereon cooperating with said member and said last named means to constitute a driving connection for said compressor adapted to exert a minimum torsional and lateral strain on said sealing means.

5. In combination, a compressor including a casing having a driving shaft extending therefrom and sealing means surrounding said shaft for preventing leakage of fluid from said casing along said shaft, a hub formed on said casing and having a longitudinal bore therein surrounding said sealing means on said shaft, a driving pulley journaled on said hub, a spider having a hub rigidly secured to said shaft and extending within said longitudinal bore, said spider being provided with radially extending arms, and means for resiliently connecting said radially extending arms of said spider and said pulley in driving relation, said hub and said pulley mounted thereon cooperating with said spider and said last named means to constitute a driving connection for said compressor adapted to exert a minimum torsional and lateral strain on said sealing means.

6. In combination, a compressor including a casing having a driving shaft extending therefrom and sealing means surrounding said shaft for preventing the leakage of fluid from said casing along said shaft, a supporting hub formed on said casing and having a longitudinal bore therein surrounding said sealing means and said shaft, a driving pulley provided with a hub journaled on said supporting hub, said hub of said driving pulley being provided with an inwardly extending flange adjacent the end of said supporting hub, a spider having a hub rigidly secured to said shaft and extending within said longitudinal bore, said spider being provided with a plurality of radially extending arms, said flange and said hub of said spider cooperating to close the end of said longitudinal bore, and means for resiliently connecting said radially extending arms of said spider and said pulley in driving relation, said hub and said pulley mounted thereon cooperating with said spider and said last named means to constitute a driving connection for said compressor adapted to exert a minimum torsional and lateral strain on said sealing means.

7. In combination, a compressor including a casing having a driving shaft extending therefrom and sealing means surrounding said shaft for preventing the leakage of fluid from said casing along said shaft, a supporting hub formed on said casing and having a longitudinal bore formed therein surrounding said sealing means and said shaft, a driving pulley provided with a hub journaled on said supporting hub, means for supplying lubricant to the contacting surfaces of said hub of said driving pulley and said supporting hub, means including an inwardly extending flange on said hub of said driving pulley for preventing the leakage of lubricant from said contacting surfaces, a member having radially extending portions rigidly secured to said shaft, and means for resiliently connecting said radially extending portions of said member and said pulley in driving relation, said hub and said pulley mounted thereon cooperating with said member and said last named means to constitute a driving connection for said compressor adapted to exert a minimum torsional and lateral strain on said sealing means.

8. In combination, a compressor including a casing having a driving shaft extending therefrom and sealing means including a flexible metal bellows secured to said shaft for preventing the leakage of fluid from said casing along said shaft, an annular integral supporting hub formed on said casing and having a longitudinal bore therein surrounding said sealing means and said shaft, a driving pulley provided with a hub journaled on said supporting hub, said hub of said driving pulley being provided with an inwardly extending flange adjacent the outer end of said supporting hub and extending about the outer end thereof, a spider having a hub rigidly secured to the outer end of said shaft and extending within said longitudinal bore, said spider being provided with a plurality of radially extending arms, said flange and said hub of said spider cooperating to close the end of said longitudinal bore, and means for resiliently connecting said radially extending arms of said spider and said pulley in driving relation, said hub and said pulley mounted thereon cooperating with said spider and said last named means to constitute a driving connection for said compressor adapted to exert a minimum torsional and lateral strain on said sealing means.

9. In combination, a compressor including a casing having a driving shaft extending therefrom and sealing means surrounding said shaft for preventing the leakage of fluid from said casing along said shaft, a supporting hub formed on said casing and having a longitudinal bore formed therein surrounding said sealing means and said shaft, a driving pulley provided with a hub journaled on said supporting hub, means for supplying lubricant to the contacting surfaces of said hub of said driving pulley and said supporting hub, means including an inwardly extending flange on said hub of said driving pulley and extending about the outer end of said supporting hub for preventing the leakage of lubricant from said contacting surfaces, a spider having a hub rigidly secured to said shaft and extending within said longitudinal bore, said spider being provided with a plurality of radially extending arms, said hub of said spider being arranged closely adjacent said flange and said flange being provided with an annular groove therein adapted to contain a sealing ring for preventing the entrance of foreign matter into said longitudinal bore, and means for resiliently connecting said radially extending arms of said spider and said pulley in driving relation, said hub and said pulley mounted thereon cooperating with said spider and said last named means to constitute a driving connection for said compressor adapted to exert a minimum torsional and lateral strain on said sealing means.

CHARLES A. IVES.